Patented Dec. 3, 1935

2,022,824

UNITED STATES PATENT OFFICE 2,022,824

PROCESS OF RECOVERING NONSUGARS FROM SACCHARINE MATERIALS

Gustave T. Reich, Philadelphia, Pa.

No Drawing. Application July 14, 1932,
Serial No. 622,565

4 Claims. (Cl. 127—48)

My invention concerns the use of isopropyl alcohol combined with ethyl alcohol to separate non-sugars in a substantially pure condition from solutions of saccharine materials, comprising beet or cane molasses, cane or beet sugar juices, sugar wastes such as saccharified grain, barley, corn, malt, and other vegetable or fruit juices.

In processes for salvaging non-sugars from such solutions, for several of which I have filed application for Letters Patent, various kinds of precipitates containing the non-sugars may be produced, these precipitates vary in many respects, requiring different treatment to secure the valuable non-sugars from them. In some previous processes, the precipitated non-sugars form in a tarry mass settling at the bottom of the vessel in which the solution is treated. This tarry mass which is produced by the treatment of these solutions by ethyl alcohol alone, is particularly difficult to handle. The present process by treating these solutions with a mixture of ethyl and isopropyl alcohol, instead of precipitating the non-sugars as a tarry mass would produce an easy flowing liquid layer, at the lower part of the vessel containing the solution. This easy flowing liquid can be utilized much more easily than the tarry precipitate to obtain from it the non-sugars, the non-sugars are contained in it in a pure state, and are more completely salvaged from the solution, and other lesser advantages are secured.

The nonsugars contained in these solutions are various. Amido compounds, potash salts, organic salts, etc., which may be free or may be combined to form salts, waxes and other valuable materials.

In my instant process, the treatment of the saccharine material causes the formation of two layers in the vessel containing the solution, the upper layer containing the saccharine components, the lower the non-sugars, both are free flowing liquids.

The separation is substantially complete.

The ethyl alcohol and isopropyl alcohol are used preferably in substantially equal quantities and the mixture of solvents is used in excess of the diluted saccharine material which is diluted, if necessary, to form a flowing aqueous solution.

In carrying out my invention I add, if necessary, to the saccharine material sufficient water to form a flowing aqueous solution. To this I add the solvents in substantially the proportions to each other and to the solids of the solution above specified. This causes the solution to form into two portions, or layers, the upper layers containing the saccharine components, and the lower the non-sugar components of the solution in a state almost free from the sugars, the aim being to get the lower layer which ordinarily will be, in quantity, from 20 to 40% of the solution, practically free from sugars, it being much less material whether or not a substantial proportion of non-sugars remained in the upper layer, which may vary largely in the amount of non-sugars contained in it, viz. from 15% of the non-sugars originally contained in the solution to 70% of them. Of course, to settle as much of the non-sugars into the lower layer is preferable.

I claim:

1. A process for obtaining non-saccharides from the class of saccharine materials composed of molasses, sugar syrups, sweet waters and sugar wastes, comprising diluting the saccharine material and then adding to the aqueous solution a partly miscible solvent consisting of a mixture of ethyl alcohol and isopropyl alcohol, and agitating, thereby causing the formation of two layers, the upper low in non-saccharides and the lower layer containing the non-sugars in practically pure condition.

2. A process for obtaining non-saccharides from the class of saccharides composed of molasses, sugar syrups, sweet waters and sugar wastes, comprising diluting the saccharine material, then adding two alcohols, namely, isopropyl alcohol and ethyl alcohol in a mixture containing equal portions of each, thereby causing the formation of two layers in the solution, the lower layer containing the non-sugars in practically pure condition.

3. A process for obtaining non-saccharides from saccharides of the class composed of molasses, sugar syrups, sweet waters and sugar waste, comprising diluting the saccharine material with water, then adding two water soluble alcohols, one being isopropyl alcohol and the other ethyl alcohol, in substantially equal proportions in the mixture, until two layers are formed in the aqueous saccharine solution, the lower layer being practically free of saccharides.

4. A process for obtaining non-saccharide materials from the class of saccharides containing the class composed of molasses, sugar syrups, sweet waters and sugar wastes, comprising dissolving the saccharine material into an aqueous solution and adding sufficient solvent composed of ethyl alcohol and isopropyl alcohol, so as to form two layers and the lower layer separated being low in saccharides.

GUSTAVE T. REICH.